June 24, 1924.

P. H. BENDELL

DIRECTION INDICATOR

Filed Nov. 12, 1923

1,498,607

INVENTOR,
Percy Herbert Bendell
By Frederick C. Bromley
ATTY.

Patented June 24, 1924.

1,498,607

UNITED STATES PATENT OFFICE.

PERCY HERBERT BENDELL, OF COLLINGWOOD, ONTARIO, CANADA.

DIRECTION INDICATOR.

Application filed November 12, 1923. Serial No. 674,276.

*To all whom it may concern:*

Be it known that I, PERCY HERBERT BENDELL, a subject of the King of Great Britain, and resident of the town of Collingwood, in the Province of Ontario, in the Dominion of Canada, have invented a new and useful Improvement in Direction Indicators, of which the following is a specification.

The invention relates to direction indicators as described in the present specification and shown in the accompanying drawings that form part of the same.

The invention relates to motor vehicle indicators and has for its object provisions whereby a driver can indicate ensuing movements of his vehicle to traffic and pedestrians.

The invention consists essentially of independent indicators for lateral attachment to a vehicle, each comprising a casing possessing an extensible arm, a swinging bracket mounted on the steering axle of the vehicle, a wheel disposed in the bracket and connecting to a spool, which in turn is connected to the indicator arm by a flexible element wound thereon, and a pedal communicating with the said bracket whereby, upon depression, the bracket wheel is swung into frictional engagement with one of the running gear wheels causing the rotation of the spool and raising the arm to an indicating position.

Figure 1:
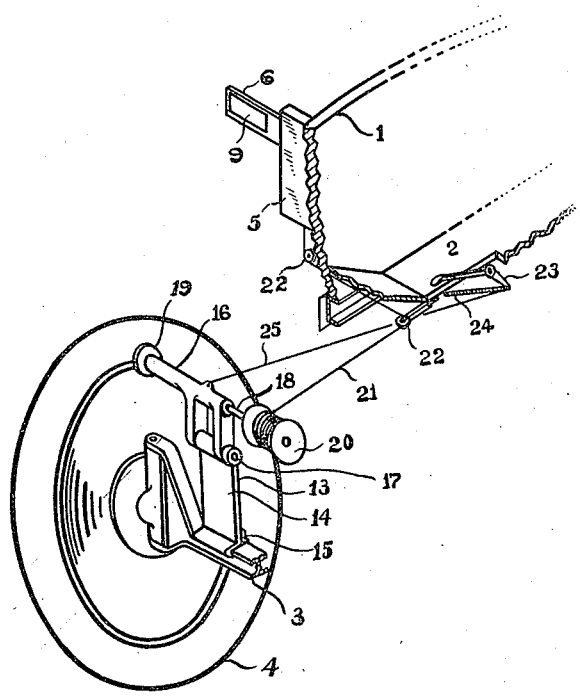

Referring to the drawings, Figure 1 is a fragmentary view of a motor vehicle illustrating the invention associated with the running gear and foot-board thereof.

Figure 2:
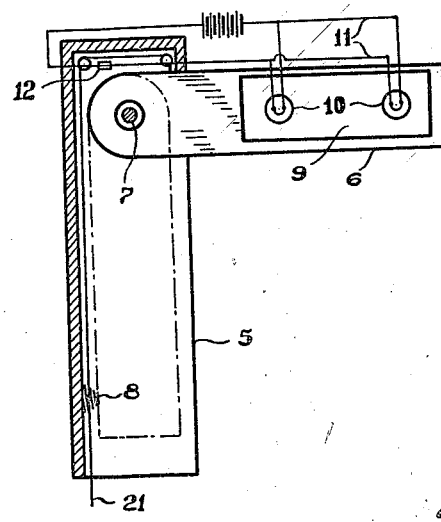

Figure 2 is a detail of the indicator proper showing the arm in extended position.

Like numerals of reference indicate corresponding parts throughout the figures of the drawings.

In the drawings, an individual indicator unit only is shown, it being understood that the other unit is symmetrical in every way and similarly attached to the vehicle. For this reason the description of the present invention will be confined to a single indicator unit.

1 designates the vehicle side to which the indicator proper is attached; 2 the floor-board, and 3 the steering axle of the running gear; the usual wheels, of which one only is shown, being indicated by the numeral 4.

5 is the indicator casing secured in any convenient manner to the vehicle and, preferably, located in the most conspicuous position. 6 is an arm pivoted therein at 7 and capable of swinging from a vertical to a horizontal position.

8 is a buffer disposed within the casing 5 to receive the impact of the arm 6 upon retraction to an inert position.

9 are windows of which there are two, one on each side of the arm 6, preferably of a red colour and possessing interlocated incandescent bulbs 10, having conducting wires 11 connecting to a source of electric power.

12 are contacts interposing the electrical circuit so that upon the arm 6 being raised to an operative position the circuit is completed, thereby illuminating the arm.

13 is a swinging bracket comprising a base 14 detachably secured to the axle 3 adjacent its wheel 4, by an integral clamp 15; a spring-pressed head 16 pivoted to said base as at 17 and having a shaft 18 journalled therein.

19 is a comparatively small wheel rigidly secured upon the outer terminus of the shaft 18, and arranged to contact with the running gear wheel 4 near its periphery. Said wheel may have a beveled contour if so desired to facilitate its frictional engagement.

20 is a spool rigidly secured on the opposing terminus of the shaft 18 and having a relieved face on which is wound one end of a wire 21, the said wire extending from thence through a series of pulleys 22 to the casing 5, penetrating the same and passing over further pulleys to the arm 6 where it is secured.

23 is a pedal pivoted to the floor-board 2, convenient to the operator; said pedal being held in a normal inactive position by a spring 24 and connected to the bracket-head by a wire 25.

In the operation of this indicator, upon the operator desiring to indicate a contemplated movement of his vehicle, such as a change of direction, it is merely necessary to depress the pedal 23 which induces the wheel 19 to frictionally engage the wheel 4 thus imparting rotary motion thereto and to the spool 20; as the spool revolves the wire 21 is wound projecting the arm 6 outwardly to an indicating position. Upon releasing the pedal the bracket head reverts back to a normal position again through its spring action, and the arm is gravity retracted and concealed within its casing.

What I claim is:—

1. In a direction indicator, the combination with a pivoted indicating arm, of a bracket comprising a base for attachment to the running gear of a motor vehicle, a spring-pressed head pivoted in said base, a wheel journalled therein for engagement with a wheel of said running gear, a rotatable spool connected with the first mentioned wheel, a flexible element secured to said arm adapted for winding upon said spool for the purpose of projecting said arm to an indicative position, and means associated with said bracket to effect engagement of the first mentioned wheel with that of the running gear.

2. In a direction indicator, the combination with a pivoted indicating arm, of a swinging bracket for attachment to the running gear of a motor vehicle, a shaft journalled therein, a wheel rigidly mounted upon said shaft for engagement with a wheel of said running gear, a spool securely affixed upon the shaft, a wire secured to said arm adapted for winding upon said spool to project said arm to an indicative position, and means associated with said bracket to effect engagement of the first mentioned wheel with that of the running gear.

Signed at Collingwood, Ontario, Canada, this 2nd day of Nov. 1923.

PERCY HERBERT BENDELL.

Witnesses:
JULIA BENDELL,
JAS. JOHNSTONE.